(12) United States Patent
Zinjuvadia

(10) Patent No.: US 7,760,668 B1
(45) Date of Patent: Jul. 20, 2010

(54) SELF-RECONFIGURING SPANNING TREE

(75) Inventor: Vishal Zinjuvadia, San Jose, CA (US)

(73) Assignee: Force 10 Networks, Inc., San Jose, CA (US)

( * ) Notice: Subject to any disclaimer, the term of this patent is extended or adjusted under 35 U.S.C. 154(b) by 774 days.

(21) Appl. No.: 11/480,075

(22) Filed: Jun. 30, 2006

Related U.S. Application Data

(62) Division of application No. 11/455,948, filed on Jun. 20, 2006.

(51) Int. Cl.
*H04L 12/28* (2006.01)
*H04L 12/56* (2006.01)

(52) U.S. Cl. .................. 370/256; 370/392; 370/401

(58) Field of Classification Search ......... 370/252–256, 370/389, 392, 400, 401
See application file for complete search history.

(56) References Cited

U.S. PATENT DOCUMENTS

| | | | |
|---|---|---|---|
| 5,150,360 A * | 9/1992 | Perlman et al. ............. 370/402 |
| 5,315,592 A | 5/1994 | Conant et al. |
| 6,330,229 B1 | 12/2001 | Jain et al. |
| 6,438,128 B1 | 8/2002 | Kashyap |
| 6,515,969 B1 | 2/2003 | Smith |
| 6,614,764 B1 | 9/2003 | Rodeheffer et al. |
| 6,678,241 B1 | 1/2004 | Gai et al. |
| 6,697,349 B2 | 2/2004 | Mathis et al. |
| 6,771,593 B2 | 8/2004 | Popovich |
| 6,813,250 B1 * | 11/2004 | Fine et al. ................... 370/256 |
| 6,826,158 B2 | 11/2004 | Seaman et al. |
| 6,917,986 B2 * | 7/2005 | Mor et al. .................. 709/238 |
| 6,937,576 B1 | 8/2005 | Di Benedetto et al. |
| 6,954,437 B1 | 10/2005 | Sylvest et al. |
| 7,089,536 B2 * | 8/2006 | Ueki et al. .................. 717/131 |
| 7,151,752 B2 * | 12/2006 | Frouin et al. ................ 370/256 |
| 7,379,429 B1 * | 5/2008 | Thottakkara ................ 370/256 |
| 7,627,654 B2 * | 12/2009 | Ramanathan et al. ....... 709/220 |
| 2001/0033550 A1 | 10/2001 | Banwell et al. |
| 2002/0118640 A1 * | 8/2002 | Oberman et al. ............ 370/230 |
| 2003/0056001 A1 * | 3/2003 | Mate et al. .................. 709/238 |
| 2004/0062209 A1 * | 4/2004 | Goldman et al. ............ 370/256 |
| 2004/0239978 A1 * | 12/2004 | Didriksen et al. .......... 358/1.15 |
| 2005/0063318 A1 | 3/2005 | Xu et al. |
| 2006/0007869 A1 * | 1/2006 | Hirota et al. ................ 370/244 |
| 2006/0109801 A1 * | 5/2006 | Ashwood Smith .......... 370/256 |
| 2006/0282892 A1 * | 12/2006 | Jonnala et al. ................ 726/23 |
| 2007/0140147 A1 | 6/2007 | Touve et al. |

OTHER PUBLICATIONS

Tobagi, Fouad A., Molinero-Fernández, Pablo, and Karam, Mansour J., Study of IEEE 802.1p GARP/GMRP Timer Values, The GARP/GMRP Protocol, pp. 1-28, IEEE 802.1p standard, Stanford University, Jun. 30, 2006.

Javvin Network Management & Security, GARP: Generic Attribute Registration Protocol, Aug. 1, 2005, pp. 1-3, IEEE 802.1P, http://www.javvin.com/protocolGARP.html, Javvin Technologies, Inc., California, USA.

(Continued)

*Primary Examiner*—Hong Cho

(57) ABSTRACT

A dynamic multiple spanning tree protocol is described. In at least one embodiment, this protocol allows for the dynamic creation and destruction of mappings between traffic attributes and spanning tree instances with the spanning tree region. These mappings are determined based on the observation of events in the spanning tree, such as the appearance of a significant traffic stream, not mapped to any spanning tree instance, at an edge port of the region. Other embodiments are also described and claimed.

28 Claims, 7 Drawing Sheets

OTHER PUBLICATIONS

Javvin Network Management & Security, IEEE 802.1p: LAN Layer 2 QoS/CoS Protocol for Traffic Prioritization, Aug. 1, 2005, pp. 1-3, IEEE 802.1Q (VLANs tagging), Javvin Technologies, Inc., California, USA.

Javvin Network Management & Security, GVRP: GARP VLAN Registration Protocol, Aug. 1, 2005, pp. 1-3, IEEE 802.1P and IEEE 802.1Q, Javvin Technologies, Inc., California, USA.

Javvin Network Management & Security, GMRP: GARP Multicast Registration Protocol, Aug. 1, 2005, pp. 1-3, IEEE 802.1P, Javvin Technologies, Inc., California, USA.

Office Action of Nov. 20, 2008, from parent U.S. Appl. No. 11/455,948.

Response to Office Action of Nov. 20, 2008, filed Apr. 20, 2009, from parent U.S. Appl. No. 11/455,948.

* cited by examiner

SELF-RECONFIGURING SPANNING TREE

CROSS-REFERENCE TO RELATED APPLICATION

This application claims priority to and is a divisional of U.S. patent application Ser. No. 11/455,948, filed Jun. 20, 2006, which is incorporated herein by reference in its entirety.

BACKGROUND

1. Field of the Invention

The present disclosure relates generally to network switching, and more particularly to an adaptive spanning tree protocol that allows multiple spanning tree instances to be dynamically modified based on selected traffic attributes.

2. Description of Related Art

Spanning Tree Protocols (STPs) are used in computer networks to maintain a reconfigurable-on-failure loop-free network topology within a group of interconnected switches having redundant paths. In the original STP specification (IEEE 802.1D, published by the Institute of Electrical and Electronic Engineers), failover and fallback of links to employ alternate paths was timer-based.

Enhancements to the core spanning tree protocol were suggested, allowing rapid convergence and recovery of the spanning tree after link failure, independent of any timer. These enhancements became known as the Rapid Spanning Tree Protocol (RSTP), described in the IEEE 802.1w specification, currently merged into the IEEE 802.1D-2004 standard.

Further enhancements to the basic spanning tree protocol were made to allow a group of switches to run multiple spanning trees instances within the same spanning tree domain. An administrator provisions each switch in the spanning tree domain with a mapping between spanning tree instances and VLANs (Virtual Local Area Networks), and tailors the bridge parameters in each switch so that different multiple spanning tree instances will converge to different least cost paths through the network. The traffic for each VLAN is forwarded along the network paths for the spanning tree instance mapped to that VLAN. With some effort, an administrator can therefore achieve better load balancing than is generally possible with a single spanning tree instance, since no operational port will necessarily be blocked in all spanning tree instances. These enhancements are described in the IEEE 802.1s standard as the "Multiple Spanning Tree Protocol" (MSTP). Currently, MSTP has been integrated into the IEEE 802.1Q-2003 standard.

Additional enhancements in the field of spanning tree design are described in U.S. patent application Ser. No. 11/065,724, entitled "Packet Attribute-Mapped Spanning Tree Protocol," filed Feb. 24, 2005, and incorporated herein by reference. The Attribute-Mapped Spanning Tree Protocol (AMSTP) can be configured to map packet attributes other than (or in addition to) VLAN identifier to logical spanning tree instances. For instance, different spanning trees can be associated with different Ethernet layer 2 header Ethertypes, layer 3 addresses or portions of addresses, layer 4 types indicated by layer 3, IP options, multicast/unicast traffic, higher-layer header attributes, data attributes for specific packet types, etc. This structure provides powerful flexibility for dividing network resources according to a wide variety of specific traffic attributes.

BRIEF DESCRIPTION OF THE DRAWINGS

The present invention can be best understood by reading the specification with reference to the following Figures, in which.

DETAILED DESCRIPTION

Several disadvantages have now become apparent in STP, RSTP, MSTP, and AMSTP as described above. First, although spanning tree fallback topologies will be activated in each of these spanning tree protocols should one or more links go down, there are a variety of ways in which an operating spanning tree topology can become—temporarily or semi-permanently—suboptimal, without causing link failure and reconvergence of the spanning tree. The embodiments below allow dynamic reconfiguration of the spanning tree topology, e.g., in situations where link status has not changed, but some change in network hardware, traffic patterns, etc., warrants adjustment of the topology.

Figure 1:
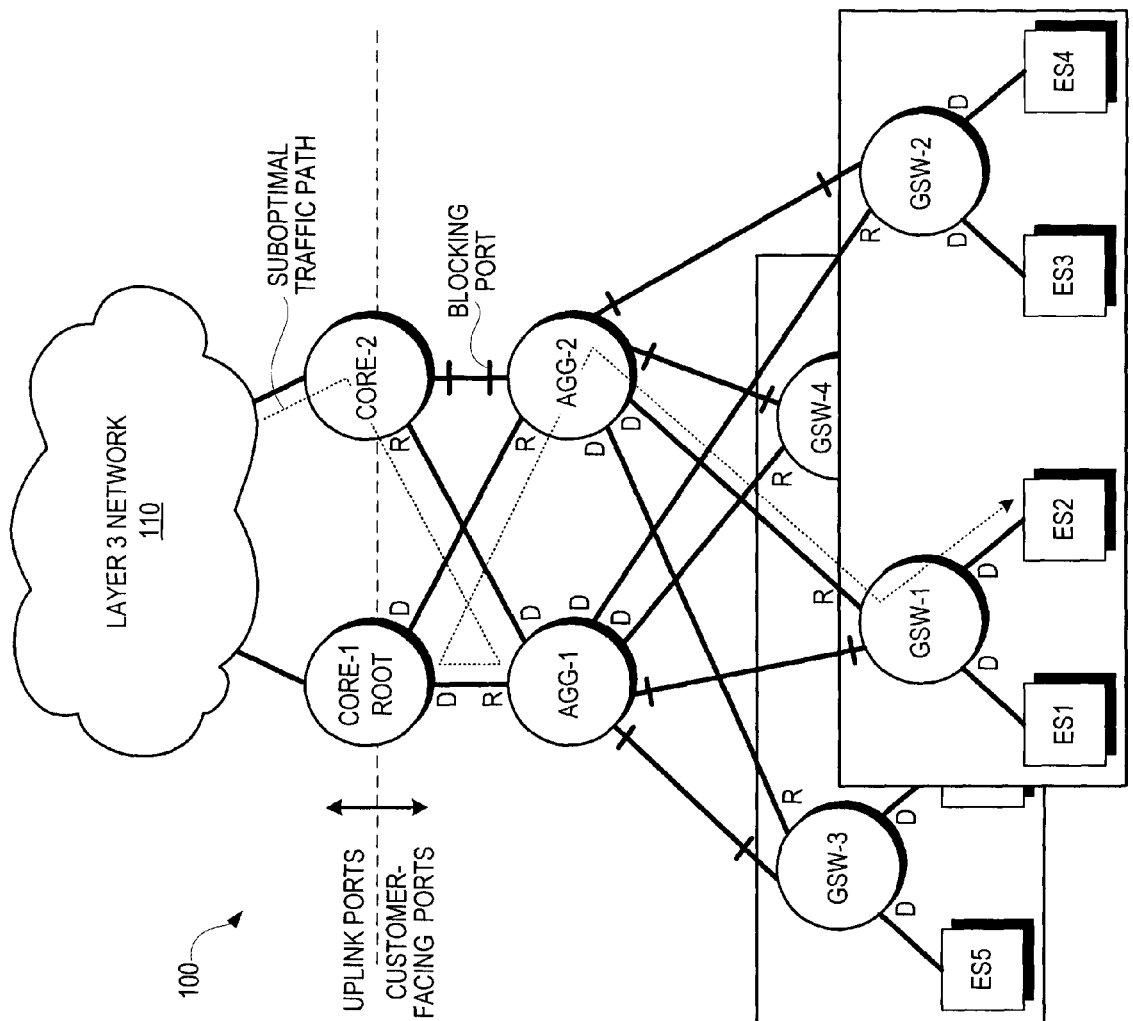
FIG. 1 illustrates a Local Area Network running a spanning tree, with a suboptimal traffic flow.

A brief description of a few spanning tree concepts and spanning tree terminology will now be presented as an introduction to the embodiments. FIG. 1 illustrates a basic network configuration 100 comprising eight exemplary switches and five exemplary end stations arranged in a local area network (LAN) connected to a layer 3 wide-area network 110. End stations ES1-ES5 represent personal computers, workstations, servers, printers, or any other network-connectable appliance. End stations ES1 and ES2 connect to edge ports of a first group switch GSW-1, end stations ES3 and ES4 connect to edge ports of a second group switch GSW-2. Several end stations, including end station ES5, connect to edge ports of a third group switch GSW-3, and other end stations (not shown) connect to edge ports of a fourth group switch GSW-4.

Each group switch connects via two point-to-point links to, respectively, two aggregation switches AGG-1 and AGG-2. Switch AGG-1 is connected in turn by two point-to-point links to, respectively, two core switches CORE-1 and CORE-2. Switch AGG-2 also is connected by two point-to-point data connections to CORE-1 and CORE-2. The core switches each have at least one uplink port connected to the layer 3 network 110. This configuration provides at least two redundant paths between each group switch with each other group switch and with the layer 3 network. Switches CORE-1, CORE-2, AGG-1, AGG-2, GSW-1, GSW-2, GSW-3, and GSW-4 are configured in a common spanning tree domain.

Assume first that the spanning tree protocol run by the FIG. 1 switches is RSTP. Each switch that participates in the spanning tree is assigned a bridge priority, such that the operating switch having the best bridge priority (numerically lowest priority value) will be elected by the spanning tree as the root bridge. Each switch initially assumes that it is the root bridge. The switches advertise their programmed bridge priorities to each neighboring switch using protocol-specific packets known as Bridge Protocol Data Units (BPDUs). When a switch receives a BPDU advertising a bridge priority better than the switch's own bridge priority, that switch knows that it will not be elected as the root bridge; conversely, if a switch receives no BPDU advertising a better bridge priority, it continues to act as if it is the root bridge. Assuming that the switches in network configuration 100 are assigned a bridge priority in the order CORE-1, CORE-2, AGG-1, AGG-2, GSW-1, GSW-2, GSW-3, GSW-4, then switch CORE-1 will become the root bridge for the configuration as shown.

Through the interchange of BPDUs, the switches also learn which one, if any, of their ports will become a root port—the port that is closest to the root bridge in terms of port cost. The interchange of BPDUs also allows the switches to assign designated ports for each network segment—a designated port is defined as the port capable of sending the best BPDUs on the segment to which it is connected. Root and designated ports are shown in FIG. 1 by an "R" and a "D", respectively. A switch receiving a broadcast packet on its root port or one of its designated ports will forward the packet on all other such ports.

The remaining ports are neither root nor designated ports. These ports are described as blocking ports and are illustrated in FIG. 1 with a bar drawn through the network connection near the port. These ports do not learn MAC (Media Access Control) addresses from received frames and do not forward frames. This prevents traffic loops that would otherwise exist in the network topology.

One drawback of the FIG. 1 configuration is that it defines a common spanning tree for all traffic. The blocked ports in the topology represent unused bandwidth that could be useful, were there a way to use it, and in some instances represent a lower cost path to a destination, were that path not blocked. For instance, consider a packet arriving from layer 3 network 110 at switch CORE-2, with a destination at endpoint ES2. Because switch CORE-1 is the root switch, that packet must travel a longer (and therefore suboptimal) path through switches CORE-2, AGG-1, CORE-1, AGG-2, and GSW-1 to reach endpoint ES2.

Figure 2:
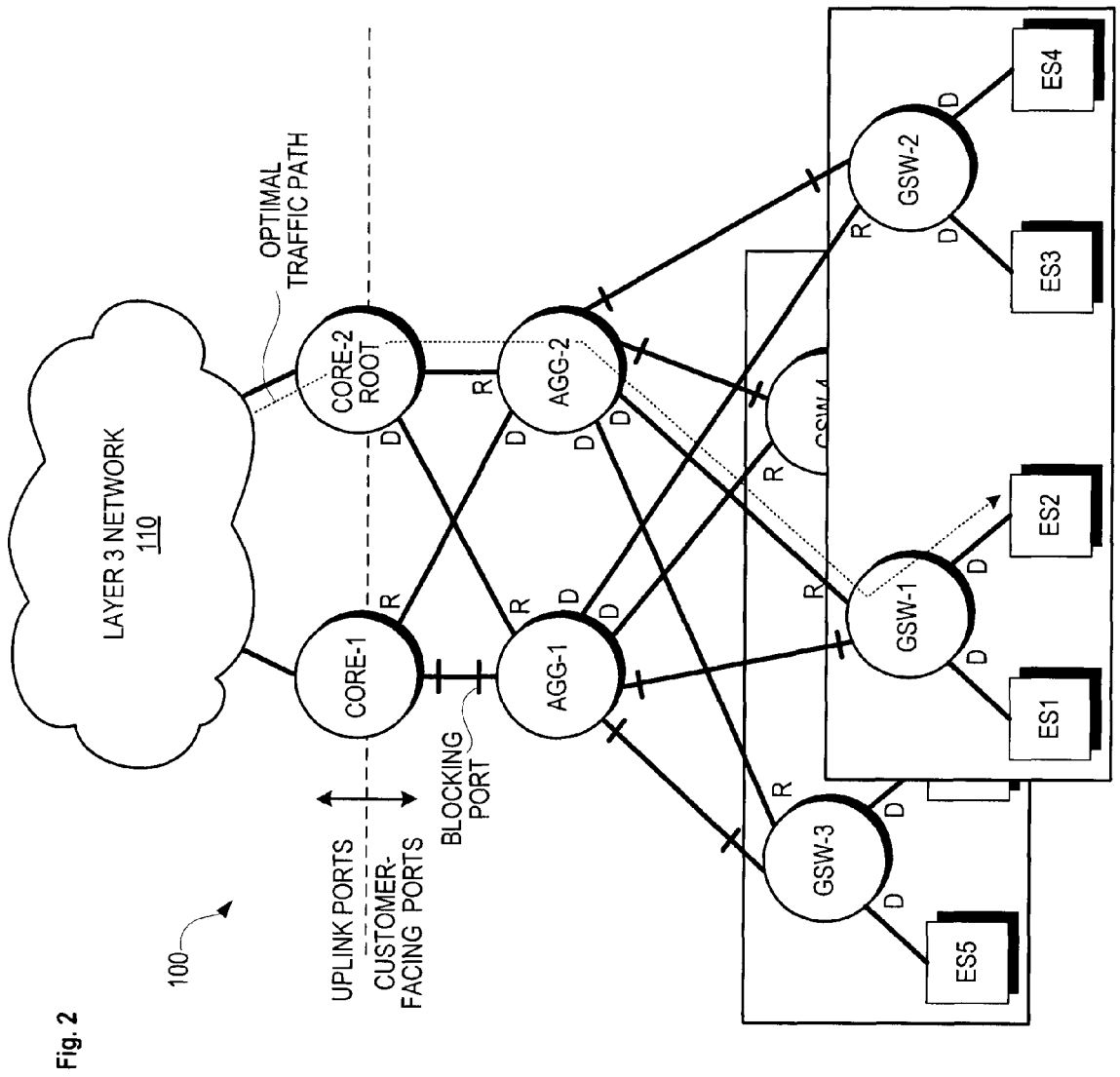
FIG. 2 illustrates the Local Area Network of FIG. 1 with a different spanning tree configuration that reroutes the previously suboptimal traffic flow optimally.

FIG. 2 illustrates network 100 in a different topology, with switch CORE-2 elected as the root bridge. In this case, the example packet arriving at CORE-2 from layer 3 network 110 takes an optimal path through switches CORE-2, AGG-2, and GSW-1 to reach endpoint ES2. Note, however, that other traffic (for instance traffic arriving at switch CORE-1 from the layer 3 network and destined for endpoint ES2) would now be suboptimal.

Figure 3:
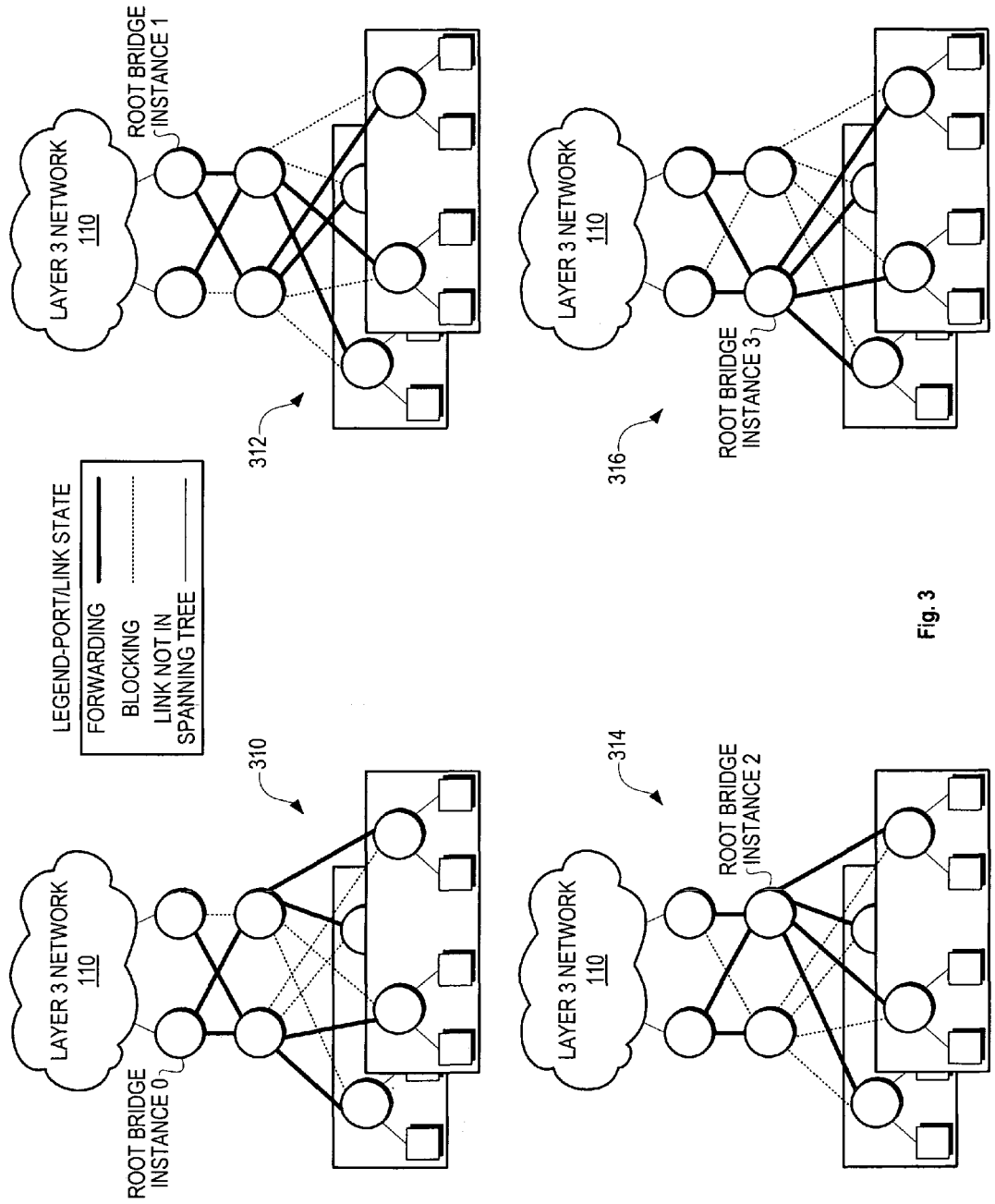
FIG. 3 shows the LAN of FIG. 1 with four different root bridges and spanning tree configurations.

With MSTP and AMSTP, it is possible for switches to use different spanning trees for packets belonging to different VLANs (MSTP), or for packets with specified attributes (AMSTP). FIG. 3 shows four possible spanning tree instances for the network of FIGS. 1 and 2, with the link state for spanning tree instances 0, 1, 2, and 3 shown respectively in FIG. 3 diagrams 310, 312, 314, and 316. Note that in each diagram, a different root bridge has been elected, and least cost paths have been calculated to that root bridge. Other spanning tree instances are also possible in this network configuration, but these four provide sufficient illustration for the description of the following embodiments.

In MSTP, each VLAN is assigned to one of 64 logical spanning tree instances (or a subset of the 64, such as the four instances shown in FIG. 3). This is accomplished by populating a 4096-element MSTP table on each switch with an association between each of the 4096 possible VLAN IDs and one of the 64 logical spanning tree instances. When a switch receives a VLAN-tagged packet, it reads the VLAN ID for the packet and refers to the MSTP table to determine the appropriate spanning tree instance for that VLAN ID.

Within an MSTP region, only one set of BPDUs is propagated by each switch. The BPDU format for MSTP contains a fixed first section, followed by a variable number of configuration messages, one per MST instance. The BPDU format is as follows:

Protocol Identifier
Protocol Version Identifier
BPDU Type
CIST Flags
CIST Root Identifier
CIST External Path Cost
CIST Regional Root Identifier
CIST Port Identifier
Message Age
Max Age
Hello Time
Forward Delay
Version 1 Length = 0
Version 3 Length
MST Configuration Identifier
CIST Internal Root Path Cost
CIST Bridge Identifier
CIST Remaining Hops followed by a variable number of configuration messages of the following format:

MSTI Flags
MSTI Regional Root Identifier
MSTI Internal Root Path Cost
MSTI Bridge Priority
MSTI Port Priority
MSTI Remaining Hops The fixed first section contains information that is used to establish a Common Internal Spanning Tree (CIST) that will be used within the MSTP region as a default spanning tree for traffic not otherwise assigned, and represents the MSTP region as a virtual bridge to the outside world. Many of these fields correspond to RSTP fields used to establish an RSTP Spanning Tree. The MST configuration identifier field, however, identifies the MST group by an alphanumeric configuration name, a configuration revision number, and a digest value. Each switch calculates its MSTP digest value by hashing its VLAN-to-MSTP-instance mapping table with a known hash function, the "HMAC-MD5" algorithm described in Internet Engineering Task Force document RFC 2104. The digest value transmitted within a BPDU must match the internally-calculated digest value in order for a switch to recognize the BPDU as one originating from its MSTP region. Thus if the VLAN mapping tables for two connected switches do not match exactly, the two switches will transmit BPDUs with different digest values. Consequently, the two switches will not cooperate in a common MSTP region, and each assumes that the port on which it receives the differing digest value (or no digest value) is at the MSTP region boundary.

Assuming that the MST configuration identifier digest matches a switch's digest, the switch will participate in establishing a CIST for the region and a number of MST Instances (MSTIs) equal to the number of MSTI configuration messages. For each MSTI, the corresponding MSTI Configuration Message contains bridge and port priorities used to calculate a spanning tree for that instance. A network administrator assigns different bridge and/or port priorities in different MSTIs for at least some switches, such that the MSTIs may be designed to elect different root bridges and may block and forward on different ports to achieve a more load-balanced topology.

It can be appreciated that the complexity of the MSTP approach changes little as further VLANs are included in the MSTP instances. Efficient manual design of the spanning tree bridge and port priorities for each instance and VLAN-to-instance mapping becomes more challenging, however, as network size grows.

In the AMSTP approach, logical spanning tree instances such as the four instances shown in FIG. 3 can be mapped to a wide variety of traffic attributes other than, or in addition to, VLAN ID. For example, the following Layer 2 header fields, which appear in at least one version of Ethernet II/IEEE 802.3 headers, can be used alone or in some combination as a spanning tree attribute:

Destination MAC (Medial Access Control) address
Source MAC address
Layer 3 Protocol Type ("Ethertype")
DSAP/SSAP (IEEE 802.2 Destination Service Access Point/Source Service Access Point)

Furthermore, many switches also support parsing of Layer 3 header fields when switching traffic at Layer 2, making these fields available as a spanning tree attribute. For instance, when combined with an Ethertype attribute of 0x0800, which indicates that a packet is an Internet Protocol version 4 (IPv4) packet, the following IPv4 layer 3 header fields can also be a spanning tree attribute:

Version Number
Header Length
Type of Service
Total Length
Packet ID
Flags
Fragment Offset
TTL (Time-To-Live)
Layer 4 Protocol Type
Header Checksum
Source IP Address
Destination IP Address
IP Options In some AMSTP embodiments, a network administrator can be presented with several supported traffic attributes, from which she can select one or several that make sense for the particular network topology and switching resources. The network administrator specifies how various values of the attribute(s) are to be split among a set of spanning tree instances, and loads this association and selection of attributes to the switches that are members of the region. The switches use the attribute selection and attribute/spanning tree association to build a digest that can be used to recognize other switches in the same region. If the selected attributes (for instance some layer 3 header fields, higher-layer attributes, or data attributes) are not used already by the switch to perform CAM (Content-Addressable Memory) lookups, the switch can add these fields to the lookup key to maintain forwarding performance.

When the new configuration is propagated, the switches can then use it to calculate the network topology. The MSTP BPDU framework, modified (by at least inserting a digest calculated for AMSTP attributes) to indicate that the BPDUs are for AMSTP and not MSTP, can be used to exchange BPDUs and converge the network to a multiple spanning tree solution. The switches then use the attribute/spanning tree association provided by the network administrator to forward traffic.

The desirable attributes of the MSTP and AMSTP protocols include the ability to attain a loop-free network topology, the ability to load-balance traffic, the ability to provide an alternate topology that can be advanced should a link or node fail, and the ability to run multiple internal spanning tree instances with a single code instance and set of BPDUs. AMSTP includes enhanced flexibility in the binding of selected traffic to spanning tree instances.

In the embodiments described below, an RSTP, MSTP, or AMSTP spanning tree region can be dynamically reconfigured to respond to certain types of events. For instance, if layer 3 traffic began entering the network at a different location, one embodiment allows a network device to initiate a layer 2 realignment to better match the layer 2 topology to the new layer 3 topology. In another embodiment, changes in the resources available at a network node (short of total failure of a link) cause that node to adjust its bridge/port priority and trigger reelection of a root bridge and reconvergence of the spanning tree. In yet another embodiment, dynamic traffic mapping to spanning tree instances is used to respond to transient traffic conditions. These and other embodiments will now be described in further detail.

In a first embodiment, a switch recognizes that due to an event occurring outside of the LAN, traffic is following a suboptimal path through the LAN. Switches participating in a spanning tree initially determine their best (least cost) path towards the root switch and designate the switch port following this path as their root port. This guarantees that the traffic from the switch to the root flows via the least cost path in the Layer 2 topology. In similar fashion, Layer 3 unicast and multicast routing protocols provide the least cost Layer 3 path(s) for routed traffic. This path may span one or more autonomous systems. In a typical enterprise topology, such as the one shown in FIG. 1, once a routed packet reaches its destination network, it is no longer routed, but is handed over to a data VLAN in the Layer 2 topology, and is switched to its final destination using the least-cost path determined by the controlling spanning tree protocol.

In a prior art system, the Layer 3 routing protocol and the Layer 2 switching protocol have no awareness of each other. A network engineer would attempt to bridge the gap by configuring the Layer 2 topology in such a way as to avoid any bottlenecks between the Layer 3 entry point into the destination network and the Layer 2 topology. If for some reason external to the destination network (such as a change in routing cost) the routed traffic enters the network at a different location than that intended by the network engineer, bottlenecks and/or increased latency may follow as the traffic follows an unintended and potentially lower-capacity and/or longer path.

In this embodiment, a mechanism exists to detect misalignment between the Layer 2 and Layer 3 topologies, and then adjust the Layer 2 topology to realign it with Layer 3. For instance, FIG. 4 contains three diagrams 410, 412, and 414 showing three different paths from a multicast source "S"

somewhere within layer 3 network 110 to a multicast receiver within the illustrated Layer 2 network. In diagram 410, a single switch operates as both the STP Root Bridge and as a Protocol Independent Multicast (PIM) Forwarder. The PIM Forwarder receives multicast traffic bound for the Layer 2 network, including multicast traffic from source S. The multicast traffic path is optimized for both Layer 2 and Layer 3, using static configuration provisioned by the network engineer.

In diagram 412, the PIM Forwarder for source S has moved away from the STP Root Bridge, causing the multicast traffic received from source S to travel an inefficient path back to the STP Root Bridge and then down to the destination endpoint. As the PIM Forwarder designation may be out of the local network's control, what seems more efficient from a Layer 3 standpoint (e.g., least cost to reach source S) has resulted in inefficiency in the Layer 2 forwarding paths.

In one embodiment, one of the switches, e.g., switch 420 now hosting the PIM Forwarder, recognizes that it is receiving multicast traffic from the Layer 3 network 110, but that it is not the spanning tree protocol root bridge for that traffic (the spanning tree in question may be a single RSTP spanning tree or one of multiple spanning trees, e.g., an AMSTP spanning tree dedicated to the particular multicast traffic associated with source S). Switch 420 analyzes the root bridge priority for the spanning tree in question, and selects for itself a root bridge priority that will ensure switch 420's election as the root bridge upon a recalculation of the spanning tree. Switch 420 then instigates a recalculation of the spanning tree.

After recalculation of the spanning tree, switch 420 is elected as the root bridge for the spanning tree in question, as shown in diagram 414. Because the STP root bridge and PIM forwarder are now aligned, traffic efficiency for the multicast traffic originating from source S is restored.

In a similar embodiment, switch 430 (diagram 412) can recognize that it is no longer the PIM forwarder for the multicast traffic in question, adjust its bridge priority so that it will no longer be the root bridge for the spanning tree that forwards traffic from source S, and initiate recalculation of the spanning tree to relinquish its root bridge status.

Figure 4:
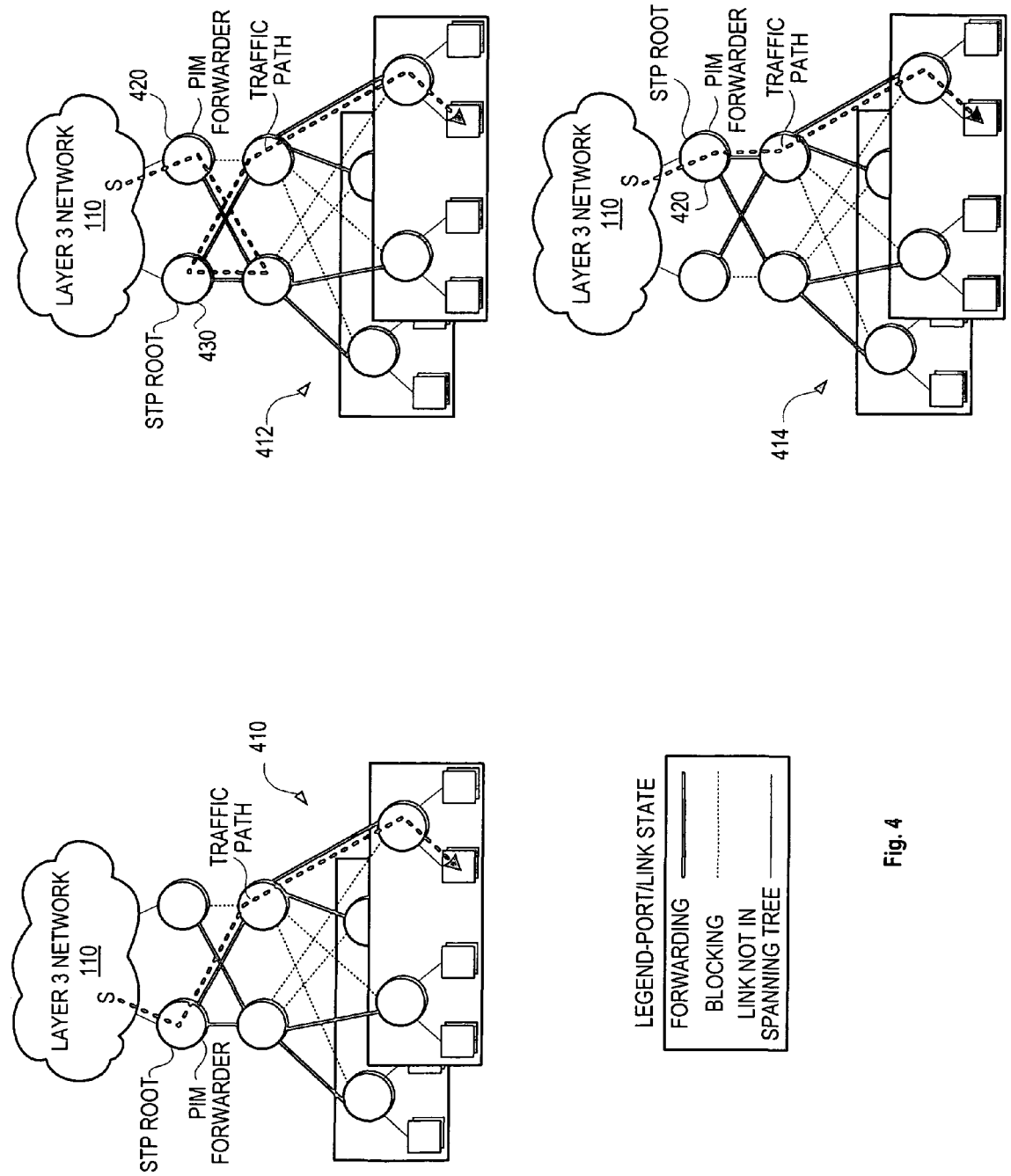
FIG. 4 depicts the dynamic reconfiguration of a spanning tree root bridge designation to respond to the movement of Layer 3 traffic at the edge of the network.

Recognition of events such as the one shown in FIG. 4 can be based on various observations made by a network entity. For instance, in one embodiment, a switch snoops Layer 2 or Layer 3 control packets available to that switch. In the PIM forwarder example, PIM control traffic is snooped to determine the identity of the switch/router acting as the PIM forwarder for the LAN. In another embodiment, a monitoring mechanism such as the Simple Network Management Protocol (SNMP) can be used to monitor Layer 2 and/or Layer 3 protocol states. When a protocol state change reflects an event that could cause a less than optimal condition on a spanning tree, the monitoring device can conduct an analysis to decide whether a new device should be elected as the root bridge for that spanning tree, and initiate a rebalancing of bridge priorities and recalculation of the spanning tree to cause the desired realignment of the spanning tree. The SNMP monitoring device can be one of the switches in the LAN or an external entity.

Events that cause spanning tree reconvergence according to some embodiments can be events other than traffic-related events. One example is a change in the capabilities of a switch that do not directly affect the link capabilities of the switch's spanning tree ports. For two switches with similar processing power, the one that has a redundant management module, a redundant power supply, or a redundant switch fabric module would be a better choice for the root switch. Other factors such as location of the switch in the physical network topology and the logical (VLAN) topology may also affect precedence in the root selection algorithm. As an example of how hardware considerations could affect root bridge desirability, consider a switch that is chosen to be a spanning tree root switch, and then subsequently one of several ganged switch fabric modules on the switch malfunctions and is shut down. Under such a condition, all external ports of the switch may continue to function normally, but the switch may not be able to switch traffic at its normal line rate.

Current spanning tree solutions do not react to such events. According to a present embodiment, when a second switch with sufficient internal switching capacity and similar location in the topology as the impaired switch exists, the second switch can be automatically reconfigured to assume the role of the spanning tree root bridge when the capabilities of the first switch are compromised. In a minimal implementation, the bridge priority of the switch experiencing a partial internal failure can be reduced (by increasing the numerical value of the bridge priority to a second value), and then the switch forces a spanning tree reconvergence. Other, more complex reconfiguration formulae can recalculate a bridge priority to reflect the remaining redundancy and/or throughput of the switch. Also, in an AMSTP implementation where particular STIs rely on particular internal switch capabilities, a failure that affects the availability or redundancy of those particular capabilities could affect the bridge priority for some instances differently than others.

Weighed against the preference for a root bridge change in such circumstances are the undesirable consequences of a topology change. For instance, some traffic can be lost while the network reconverges. Also, at a topology change the MAC address and ARP (Address Resolution Protocol) tables in each switch are flushed, causing substantial packet flooding in the network. As these penalties may in some cases be worth forcing a topology change while not in others, a mechanism can be put in place to tailor topology change behavior depending on the observed conditions.

To implement dynamic spanning tree recalculation based on switch capability changes in one embodiment, the network administrator designates a group of switches that are capable of becoming STP root bridges. Other switches in the spanning tree but not part of the designated group that can become root bridges are prevented from ever becoming a root bridge (e.g., by assigning these switches a bridge priority high enough to insure their non-selection as a root bridge as long as at least one switch in the designated group is operating).

For switches in the designated group, an algorithm on each switch calculates a bridge priority to be used in election of a root bridge. The existing algorithm for selection of a root bridge operates such that the switch with the lowest bridge identifier (the bridge priority prepended to the bridge MAC address) becomes the root switch. This approach guarantees that one and only one switch will qualify to become the root for the spanning tree topology, since no two properly configured switches can have the same MAC address.

In this embodiment, the bridge priority portion of the bridge identifier is allowed to vary for switches in the group based on parameters known at the time of spanning tree configuration. Each resource in a switch is assigned a value in terms of a fraction of the entire range of bridge-priority. Addition of the resource to the switch could improve the priority for spanning tree instances on that switch by the assigned value, whereas removal of the resource (either manually or due to some failure) could worsen the priority. As an example, a redundant switch fabric module (SFM) could be assigned a value of 4096. Similar values can be assigned to redundant route processing modules (RPMs), power modules, etc. An even higher value, e.g., 16384, can be assigned to the presence of each high-speed uplink interface on the switch.

Each switch is assigned a base priority, to which the priorities for redundant modules, uplink interfaces, etc., are added to arrive at a bridge priority. The difference between the base priorities of an intended primary root switch and an intended secondary root switch are indicative of the network administrator's willingness to reconfigure the network upon failure of each of these resources. For example, Switch A is configured with base priority 12288. Switch B is configured with base priority 20480. All other switches in the LAN are configured with a base priority of 61440. Since bigger numerical priorities are worse, Switch A would be elected the root bridge. Assume that the lack of a redundant SFM is assigned a value of 4096 and the lack of a redundant RPM is assigned a value of 8192. If A loses a SFM due to some failure, it would increase its numerical priority up to 12288+4096=16384. Switch A, after the loss of its redundant SFM, compares its new bridge priority to that of the other switches (as they existed at the time of the last bridge identifier exchange). As 16384 still exceeds the bridge priority of the other switches' bridge priorities, Switch A need not initiate a topology change since it would remain the root switch. At this point, if A also lost the redundant RPM, it would increase its numerical priority up to 16384+8192=24576. This event would cause switch B to become the switch with the lowest numerical priority, and switch A therefore initiates a topology change event.

Even though for current spanning tree implementations the bridge priority can be increased or decreased in increments of 4096 only, it is possible to apply any value to a resource. For example, SFM failure could be assigned the value of 2048. If the base priority of a switch A is 12288, one SFM failure would not cause any change to its bridge priority. It will take two SFM failures to worsen its priority to the next higher value of 16384. The failure or recovery of switch resources (SFM, RPM, power modules, etc.) is not communicated directly to any other switch in the spanning tree topology. Any automatic update to the bridge priority value resulting from a SFM failure would appear as a manual change in bridge priority to other switches, the next time that bridge identifier is communicated to the other switches.

The above examples can also be expanded to individual instances of the spanning tree in an MSTP or AMSTP scenario. The administrator can, for example, specify on a per-instance basis whether the bridge priority for that instance should adjust as a result of addition or deletion of resources on the switch.

In a switch, adjustments to the bridge priority can be specified for a variety of events in a manner other than specified above. For instance, in a system that normally operates with 8+1 SFM redundancy, different bridge priority adjustments can be assigned for nine operational SFMs, eight, seven, etc., and these adjustments need not be linear with respect to operational SFMs. As another example, a temperature problem on one or more boards of a switch may be assigned a bridge priority adjustment, as the temperature problem may indicate an imminent hardware problem. Also, the loss of one of several uplink interfaces on the root switch can be assigned one bridge priority adjustment, with a substantially more severe bridge priority adjustment for loss of all uplink interfaces on the switch.

In MSTP and AMSTP, the configuration of each spanning tree generally relies on some assumed traffic characteristics for the traffic mapped to each spanning tree. In the embodiments above, this is also true to at least some extent—although the spanning tree topology is dynamically rearranged for a spanning tree based on certain events, the traffic bound to each spanning tree instance is left unchanged. In some cases, however, actual traffic characteristics for a given traffic flow cannot be accurately predicted in advance, or the sheer number of potential traffic flows makes it impracticable to map each flow to an MSTP or AMSTP instance. Some traffic may also be substantial but occurring for only a short time each day (for instance), and thus unsuited to a static mapping.

Thus in a traditional MSTP or AMSTP spanning tree domain, some traffic can be assigned to appropriate spanning tree instances that generally allows the traffic to follow a least cost path through the domain. Unanticipated traffic variations within an assigned traffic classification may cause some traffic in the classification to be forwarded in a suboptimal manner. With respect to unclassified traffic, that traffic will use the Layer 2 topology generated by the default spanning tree instance (instance 0, the CIST). In many cases, the unclassified traffic will encounter a suboptimal load distribution due to its use of the CIST. Generally, any static mapping will at least sometimes fail to optimally distribute traffic across the network.

In many networks, then, at least some traffic could benefit from a spanning tree that exhibits some dynamic flexibility in response to changing traffic conditions. The embodiments described below allow an identified traffic category to be assigned to either (a) an existing spanning tree instance that is more suitable for the traffic category than its current instance, or (b) a new spanning tree instance created for that traffic category. The following example shows a dynamic assignment of this type, and a mechanism for an entity to cause such a dynamic assignment.

Figure 5:
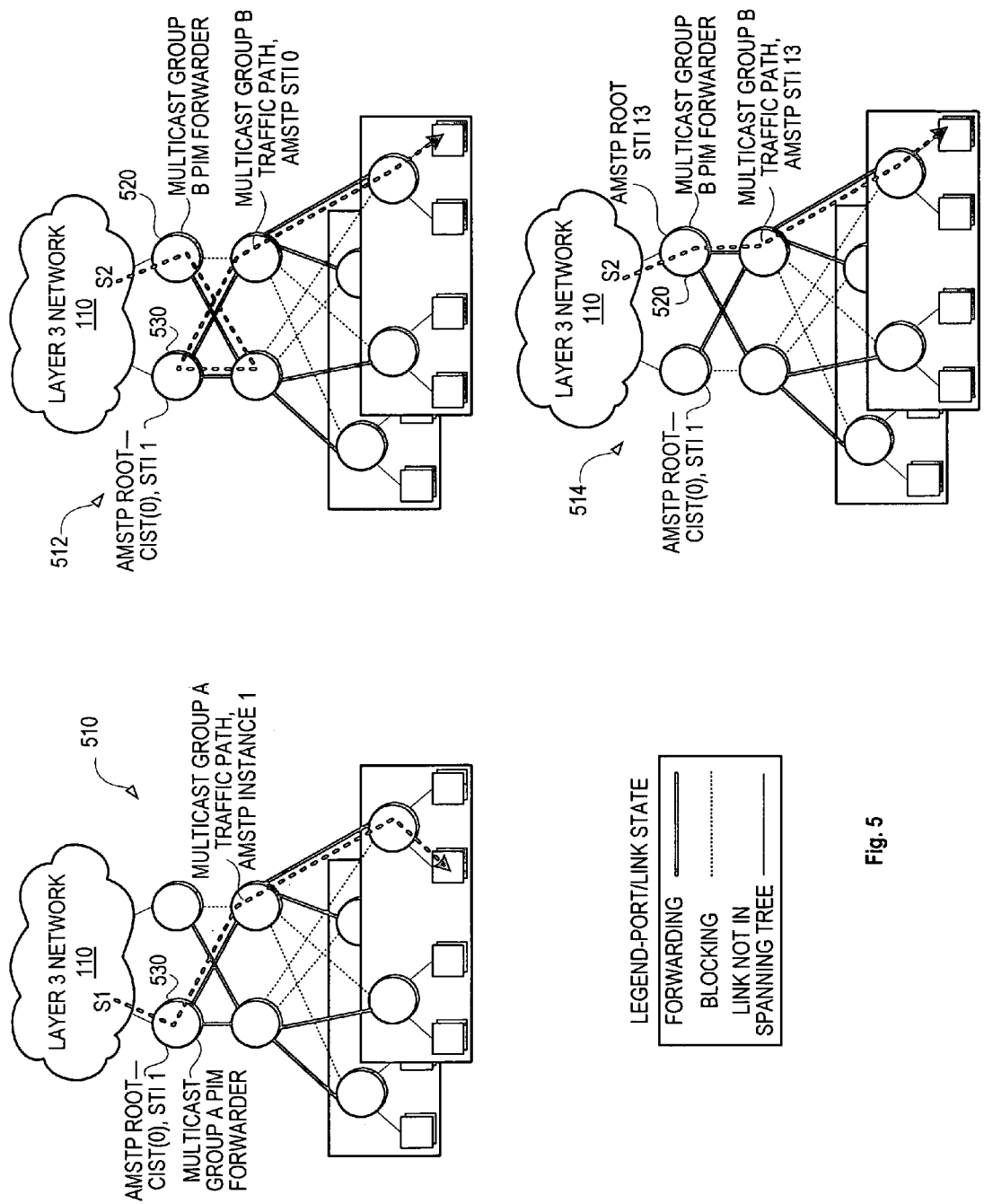
FIG. 5 depicts the dynamic reconfiguration of a spanning tree configuration to respond to a new traffic flow.

FIG. 5 shows three diagrams 510, 512, 514 of an AMSTP spanning tree domain connected to a layer 3 network 110. Referring first to diagram 510, a switch/router 530 has been selected as the root bridge for the AMSTP CIST (also referred to as Spanning Tree Instance (STI) 0) and for an AMSTP STI 1. Switch/router 530 also acts as a PIM forwarder for multicast group A traffic, e.g., received from a source S1 reachable through layer 3 network 110. The static AMSTP configuration specifies that multicast group A traffic is to be switched across STI 1. Thus the multicast group A traffic follows an optimized path from its PIM forwarder to its local network endpoint.

Referring next to diagram 512 of FIG. 5, a multicast group B begins to send traffic from a source S2 reachable through layer 3 network 110 to switch/router 520, which acts as a PIM forwarder for multicast group B traffic. Because multicast group B traffic is unclassified at this point, it follows a suboptimal path from its PIM forwarder (switch/router 520) to the CIST root bridge (switch/router 530) in order to reach its local destination endpoint.

According, e.g., to one of the techniques previously described, a network entity recognizes the existence of the multicast group B traffic and its use of a suboptimal spanning tree. That entity (or a communicating entity, e.g., switch/router 520) informs the AMSTP spanning tree domain participants that multicast group B traffic will be assigned to a STI 13, for instance by a method that will be described below. STI 13 can be a new spanning tree instance that is to be calculated by the switches in the domain, or an existing spanning tree instance that has paths and a root bridge that are desirable for the multicast group B traffic.

Diagram 514 shows one possible result of the new, dynamic mapping for multicast group B. STI 13 has a root bridge (switch/router 520) that is the same entity as the PIM forwarder for multicast group B. With a new mapping for multicast group B traffic to STI 13, multicast group B traffic now follows an optimized path according to STI 13 to its local destination endpoint.

A few other points regarding FIG. 5 can now be made, before proceeding to the specifics of the dynamic spanning tree reconfiguration. First, multicast group A's mapping to STI 1 need not be static, but can also be created dynamically. Second, multicast group A and group B traffic could both have been originally assigned, e.g., to STI 1, with the new mapping splitting or moving group B traffic to STI 13 while leaving group A traffic with STI 1. Also, the group B traffic linking to STI 13, as well as the STI 13 spanning tree instance itself, can later be removed if no longer needed.

As mentioned, the dynamic mapping of the multicast group B traffic can be based on the observation of an event, e.g., by control packet snooping, SNMP protocol state monitoring, etc. Another alternative is the direct observation of a traffic flow that appears to be unmapped. For instance, in FIG. 5 multicast group B traffic arrives in the AMSTP domain via a switch 520 upstream interface to layer 3 network 110. Switch 520 can therefore note a multicast group B packet arriving at the upstream interface as potentially of interest when it maps that packet to a static or default spanning tree instance for which switch 520 is not a root bridge. One or more thresholds can be set for packets in that stream, such as a minimum duration of a sustained traffic flow for that stream, and/or the amount of bandwidth being consumed by that stream. For instance, if switch 520 measures an unmapped traffic flow of at least a minimum bandwidth over a minimum duration, a reconfiguration of the Layer 2 mapping for that traffic flow can be initiated by switch 520. Switch 520 can continue to monitor the traffic flow, and when the traffic flow drops below a lower minimum bandwidth for the same (or a different) minimum duration, switch 520 can once again reconfigure the Layer 2 mapping to allow the traffic flow to revert to the CIST or its static mapping.

According to AMSTP, a wide variety of traffic attributes can be used to map traffic to specific spanning tree instances according to a static mapping. Although in principle all such attributes are available for dynamic mapping, in an actual implementation a network administrator will generally desire to specify certain attributes that can be dynamically mapped to a spanning tree and/or certain attributes that cannot be dynamically mapped to a spanning tree. Embodiments can use access-list command syntax to tailor the dynamic spanning tree mapping behavior.

Generally, access lists have been used to select specific traffic types that will always be dropped or diverted by a switch/router to a port other than the port that a normal routing lookup would specify. Such access lists can specify the traffic of interest using a wide variety of parameters, including:

Source IP Address, Source Mask
Destination IP Address, Destination Mask
IP Protocol type
TCP Source Port number
TCP Destination Port number
TCP Connection Flags (for example ACK, FIN, etc.)

Access list commands use a syntax such as the following:
permit <IP-Protocol #> <Src-IP> <Src-Mask> <Dst-IP> <Dst-Mask>
deny <TCP> <Src-IP> <Src-Mask> <TCP-Flag> <TCP-Src-Port> <Dst-IP> <Dst-Mask> <TCP-Flag> <TCP-Dst-Port>

In dynamic spanning tree mapping embodiments, an access list (ACL) can be used to define whether a particular traffic flow is allowed to cause network reconfiguration and be mapped to a non-CIST or non-static spanning tree instance. The ACL deny statements identify, e.g., known traffic flows that should follow the CIST topology and should not be dynamically mapped or cause any kind of spanning tree reconfiguration. For traffic streams that do not hit any permit or deny entries, a network administrator can select how that stream is to be handled. For instance, in one handling method a traffic stream that hits no permit or deny entries in the ACL will not cause any reconfiguration and will follow the usual path through the network, which could be through the CIST. There can be, however, an optional system log message, SNMP trap, or some other form of indication made to the network administrators to allow them to identify traffic flows for which explicit permit or deny statements can be added to the ACL. In another handling method, traffic that does not hit any entry (permit or deny) in the ACL can be analyzed for possible optimization if it meets all other criteria necessary to cause reconfiguration.

The following specific example shows one possibility for using an ACL. In a hypothetical network, the following ACL can be applied to Layer 3 traffic that is not mapped to a non-CIST instance:

1) deny 172.16.1.10 255.255.255.255 224.1.0.1 255.255.255.255

2) deny 10.1.1.10 255.255.255.255 224.1.0.1 255.255.255.255

3) permit any 224.1.0.1 255.255.255.255

4) deny any

In this example, 172.16.1.10 and 10.1.1.10 are local hosts that are also multicast sources for the multicast group 224.1.0.1. This multicast group also has sources outside the local network. The first two entries do not allow any multicast traffic from the two local sources to cause any network reconfiguration. The third entry, however, allows other multicast traffic to this group destination address from any other source (internal or external to the local network) to potentially cause reconfiguration of the Layer 2 topology in order to achieve an end-to-end optimized path. The last entry (4) prevents any other traffic flow from causing any reconfiguration of the local network topology. Entry 4 prevents unknown traffic flows from causing reconfiguration of Layer 2 topologies in the local network. Other ACL filters, included above entry 4, can allow and disallow other specific flows to affect the Layer 2 topology.

In an embodiment that used control packet snooping or protocol monitoring, a separate access list can be used to identify the control protocol that should be snooped or monitored and acted upon in an attempt to optimize a traffic path. When such an ACL permits a protocol, e.g., PIM, then the dynamic STP would snoop PIM control traffic in order to determine the PIM Forwarder location for a multicast group. When the PIM forwarder for a multicast group G, for instance, is not on the same switch that is the AMSTP root for group G (or no AMSTP root for group G exists), and the traffic for group G equals or exceeds the pre-configured thresholds, then reconfiguration of the Layer 2 topology can be triggered to optimize the end-to-end traffic path for group G. A protocol that is denied in the protocol-ACL will not be snooped (or monitored), and no attempt will be made to correct the unoptimized end-to-end path resulting from disconnect between the Layer 2 topology and the topology for the protocol that is denied. For instance, in the following exemplary list HSRP protocol packets will not be snooped, VRRP and PIM packets will be snooped, and all other protocol packets will not be snooped.

1) deny HSRP
2) permit VRRP
3) permit PIM
4) deny any any

Any change in the topology of the two monitored protocols causes an evaluation of the end-to-end traffic path for the traffic affected by the topology change. If any suboptimal paths are discovered, a reconfiguration might follow.

Another potential feature for the dynamic spanning tree approach is a control function that lessens spanning tree reconfiguration frequency should too-frequent reconfiguration become an issue. In one approach, the spanning tree members can log the triggers that cause them to request spanning tree reconfiguration. If a recurring trigger event is repeatedly causing reconfiguration as it appears and then disappears, the thresholds for that trigger event can be adjusted automatically, or an alert can be generated to a network administrator, who can then use an access control list entry to adjust the response to that trigger event, or deny that event from causing reconfiguration.

The actual spanning tree recalculation can also be limited in frequency. The spanning tree members can accumulate requests for reconfiguration, e.g., for several minutes, between possible spanning tree reconfiguration points. All pending reconfiguration requests can then be processed at once upon a signal, e.g., from the CIST root bridge. Any requests that are withdrawn in the interim, e.g., due to sporadic traffic, will never cause reconfiguration of the spanning tree.

In traditional spanning tree approaches, a network administrator manually provisions bridge and port priorities on each switch in a spanning tree domain, and identical MSTP VLAN-to-instance mapping tables on each switch. To change the MSTP mapping, new mapping tables must be loaded to each switch, digest values must be recalculated, and the spanning tree must be restarted. Thus a new approach for provisioning dynamic instance mapping information is needed for the rapid reconfiguration dynamic algorithm discussed above. One such approach has been devised, and is described below as a Generic Instance Registration Protocol (GIRP). Note that GIRP is primarily intended for regions that run MSTP, AMSTP, or a similar multiple-spanning-tree-instance protocol.

GIRP is built in this embodiment on the framework already in place for GARP, the Generic Attribute Registration Protocol. GARP is described in detail in Section 12 of IEEE 802.1D, which is incorporated herein by reference. GARP PDUs (Protocol Data Units) are exchanged in a reachability tree formed in a subset of a spanning tree topology. GARP allows a participant in a given GARP Application to make or withdraw declarations of attributes, and for those declarations (or withdrawals) to result in the registration (or removal of registrations) of those attributes with the other GARP Participants for that Application. Each GARP Application uses a unique group MAC address as the destination address of GARP PDUs; thus the GIRP implementation assumes a designated group MAC address be made available for the GIRP Application.

A GIRP PDU takes the following format, with a two byte protocol ID followed by a variable number of messages. The protocol ID identifies the GARP protocol.

GIRP PDU

| 2 bytes | | | |
|---|---|---|---|
| Protocol ID | Message-1 | ... | Message-n |

Each GIRP message contains a one byte attribute type descriptor, followed by a variable number of attributes of that attribute type, and an end mark. The attribute types defined for GIRP are specific to GIRP, and will be explained further below. The end mark is coded as 0.

GIRP Message

| 1 byte | | | | |
|---|---|---|---|---|
| Attribute type | Attribute 1 | ... | Attribute n | End mark |

Each GIRP attribute contains a one byte attribute length field descriptor, followed by a one byte attribute event and an attribute value of the specified attribute length. The allowable attribute events are those defined by the GARP specification:

GIRP Attribute

| 1 byte | 1 byte | 1 byte |
|---|---|---|
| Attribute length | Attribute event | Attribute value |

The allowable attribute events are those defined by the GARP specification:

0—Leave all
1—Join_Empty operator
2—Join_In operator
3—Leave_Empty operator
4—Leave_In operator
5—Empty operator The attribute value is encoded in accordance with a definition specific to the attribute type.

In the GIRP application, the formed reachability tree is a subset of the CIST (MSTP or AMSTP instance 0) topology. There is a single GIRP participant per port and all GIRP participants operate in a single GIRP context corresponding to the CIST. In switches that support GIRP, the received PDUs are submitted to the GIRP Participant associated with the receiving port for further processing. In switches that do not support GIRP, all such PDUs are submitted to the Forwarding process.

GIRP PDUs are carried over the CIST topology, and distribute information about the mapping between an attribute such as VLAN-ID, Ethertype, etc., and a spanning tree instance ID. Using GIRP, the switches in the spanning tree domain can register and de-register GARP-formatted attributes such as the MSTP region name, revision number, and instance-to-attribute mapping. GIRP propagates the attribute information to other devices in the spanning tree. The operation of GIRP defines the following attribute types:

| Attribute Type | Attribute value |
| --- | --- |
| 1 - MSTP Region Name | Character string up to 32 characters in length |
| 2 - MSTP Revision Number | Integer between 0-65535 |
| 3 - MSTP Instance ID | Integer between 0-4095 (values between 1-63 supported for now) |
| 4 - VLAN-ID | Integer between 1-4094 |
| 5 - Multicast Group Address | IPv4 (4 bytes) or IPv6 address (16 bytes) |
| 6 - EtherType | Integer - 2 bytes (0x0600-0xffff) |
| 128 - VLAN-ID-range-Min | Integer between 1-4094 |
| 129 - VLAN-ID-range-Max | Integer between 1-4094 |
| 130 - Multicast Group Address range Min | IPv4 (4 bytes) or IPv6 address (16 bytes) |
| 131 - Multicast Group Address range Max | IPv4 (4 bytes) or IPv6 address (16 bytes) |
| 132 - EtherType range Min | Integer - 2 bytes (0x0600-0xffff) |
| 133 - EtherType range Max | Integer - 2 bytes (0x0600-0xffff) |

Other attribute types, e.g., for other traffic attributes or Layer 2/Layer 3 protocols, can be added as well to extend the operation of GIRP. Of the types defined above, the following explanations apply. The MSTP Region Name (the protocol run in the region could be AMSTP as well as MSTP) is the name assigned to the region by the network administrator, and is the same name propagated in the MSTP BPDUs. Likewise, the MSTP Revision Number is the current revision number propagated in the MSTP BPDUs. An MSTP Instance ID refers to one of the allowable spanning tree instance IDs for the region.

The VLAN-ID indicates one of the VLAN-IDs defined for the region. A Multicast Group Address is an IP address (version 4 of version 6) assigned to a given multicast group. An EtherType is one of the values allowed in the EtherType field of a Layer 2 Ethernet packet header.

The remaining attributes in the table are range attributes for VLAN-ID, Multicast Group Address, and EtherType. Without a range attribute, if VLAN-IDs 1-10 were mapped to MSTP STI 1, the GIRP message for communicating the mapping would contain the following GIRP attributes in this order: <Instance ID=1> <Vlan 1> <Vlan 2> . . . <Vlan 10> <End>. Rather than including all VLANs in the GIRP message, a range attribute pair can be used to specify that all values of the attribute, including the minimum and maximum values specified, will be mapped to the instance ID carried in the preceding instance attribute. Using range attributes, the GIRP message for the preceding example would contain the following GIRP attributes: <Instance ID=1> <Vlan-Range 1> <Vlan-Range 10> <End>.

When further attributes are added to the attribute definitions above, the suggested attribute type coding reserves values 0-127 for standard GIRP attributes and values 128-255 for extended GIRP attributes.

The ordering of attributes in a GIRP message should abide by the following rules:

Only one MSTP Instance ID attribute should be present in a GIRP message.

All traffic attributes should be present in the GIRP message after the MSTP Instance ID, and will be mapped to the instance ID specified by the MSTP Instance ID attribute.

The message should contain at least one MSTP Instance ID and one standard or two range traffic attributes, although Instance 0 (the CIST) may not have any attributes mapped to it.

If a range-Min attribute is present, a corresponding range-Max attribute must be present in the same message.

Whether a switch is allowed to register attributes or not, all switches in the domain are expected to have MSTP/AMSTP enabled. Hence all switches can receive GIRP messages over the CIST topology in order to participate in dynamic traffic mapping. The mapping of instances to attributes is, however, limited to one MSTP region. Multiple MSTP Regions communicate with each other solely based on the CIST information. Hence the GIRP PDUs should be limited to one region only, and should not be propagated on external links.

GIRP allows both end-stations and bridges in a bridged LAN to issue and revoke declarations relating to the instance-to-attribute mapping. The effect of issuing such a declaration is that each GIRP participant that receives the declaration will create or update the instance mapping in the spanning tree configuration. This can result in reconfiguration of the spanning tree topology and possibly modification or addition or removal of entries in the Filtering database.

The act of registering/deregistering an instance-to-attribute mapping affects the Spanning Tree configuration on each affected switch, and may result in a topology change. Thus it may be desirable in a given implementation to restrict the attribute types that a given switch can register, on a per-attribute-type basis. For example, in a particular network topology, only the core switch(es) could be allowed to register MSTP Region and MSTP Revision number attributes, whereas any switch could register a new instance-to-attribute mapping. This access should be configurable by the network administrator on a per-attribute basis.

Several additional restrictions should also be observed with the GIRP protocol, as follows:

Once an MSTP Instance ID has been registered and attributes have been mapped to that instance by a switch, no other switch can register/de-register that MSTP Instance ID and register/de-register attributes to that MSTP Instance ID.

Only the switch that registered an MSPT Instance ID can de-register that Instance ID or any particular attribute value mapped to that Instance ID.

Once a switch registers an MSTP Instance ID and maps attributes to that instance, all other switches in the bridged LAN follow the registration and modify their spanning tree configurations. This is true for all attributes defined by GIRP.

Based on the current IEEE 802.1s standard, 64 MSTP instances have been defined including the CIST (instance 0), which is always defined by default. A switch should randomly pick an unused Instance ID from the range (1-64) when mapping an attribute to a new Instance ID.

When attempting to map an attribute to an instance, the switch should ascertain that the selected Instance-ID is not in use in the spanning tree configuration on the bridged LAN. This is possible due to the restriction that GIRP runs within one MSTP region—under stable conditions, each switch in an MSTP region is aware of all instance-to-attribute mappings.

There is a possibility that two switches in the same region would randomly choose to use the same previously unused Instance ID to map individual attributes at roughly the same time. Should such a 'collision' happen, it will be detected by both switches as they receive each other's GIRP registration messages. As soon as the originating switches notice a collision, they will send out de-register messages for the Instance ID. Each switch would then wait for a random time interval between 1 and X seconds and attempt to randomly select an unused instance ID. The value of X could default to 30 seconds and should be configurable by a network administrator. The size of the network could be one of the factors in determining an appropriate value for this parameter.

With GIRP, all register and de-register messages are forwarded to all ports (except the port on which the message was received) of the active topology.

GIRP allows static configuration of instance-to-attribute mappings on the switches in the LAN. Since GIRP runs within the boundaries of a MSTP region, such static mappings should exist on all switches in the region. Hence each switch will be aware of all mappings (static as well as dynamic) when it needs to randomly select an unused (or in use) instance to map attributes.

The following services are available using GIRP:

MSTP Region Name Registration

The MSTP Region name registration service allows switches participating in the Spanning Tree topology to:
Register the name of the MSTP region.
De-register the name of the MSTP region.

MSTP Revision Number Registration

The MSTP Revision number registration service allows switches participating in the Spanning Tree topology to:
Register the revision number for the MSTP region.
De-register the revision number for the MSTP region.

MSTP Instance-to-Attribute Mapping Definition

The MSTP Instance-to-Attribute mapping registration service allows switches participating in the Spanning Tree topology to:
Register an MSTP Instance ID and map one or more attributes to this Instance ID.
De-register an MSTP Instance ID or one or more attributes mapped to the Instance ID.

The use of these services will result in propagation of the MSTP information across the CIST Spanning Tree topology, causing a reconfiguration of the spanning tree in all the switches. This can affect the frame forwarding behavior of those switches and end stations.

Figure 6:
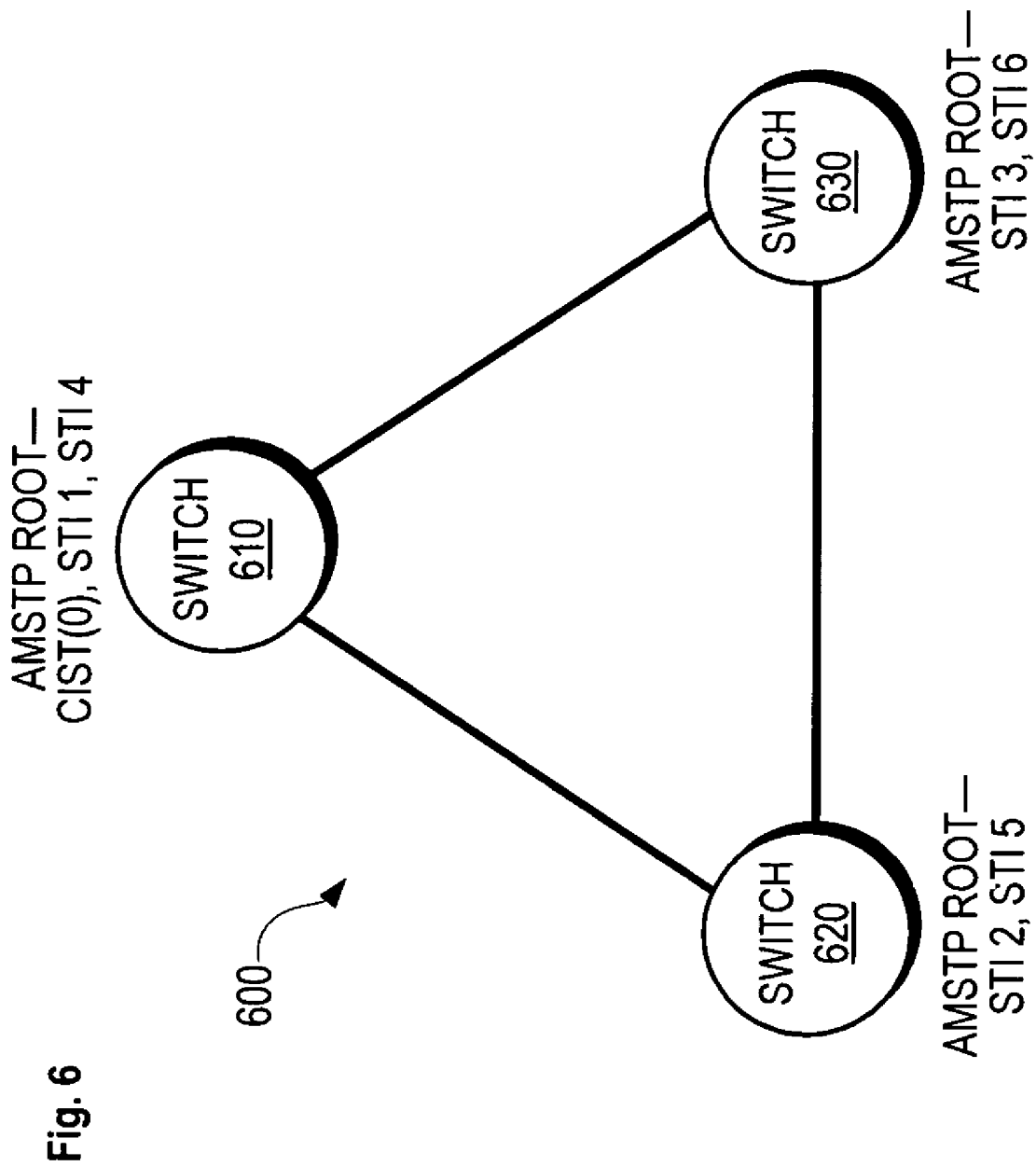
FIG. 6 shows a group of switches in a common spanning tree region, the switches sharing dynamic spanning tree instance and attribute mapping information to administer a dynamic spanning tree region.

A few short examples will now be presented to further clarify the use of GIRP to dynamically adjust a spanning tree configuration. FIG. 6 shows a segment 600 of an AMSTP region, including three GIRP-enabled switches 610, 620, and 630. It is assumed that the system administrator has provisioned bridge and port priorities such that the expected static configuration is as follows: switch 610 becomes the root bridge for the CIST and for STIs 1 and 4; switch 620 becomes the root bridge for STIs 2 and 5; and switch 630 becomes the root bridge for STIs 3 and 6. At boot-up, static tables can map defined static traffic attributes to each of the STIs, some of the STIs, or none of the STIs. The multiple spanning tree is calculated based on BPDUs exchanged using whatever static mapping values are provisioned, and the seven illustrated instances. Assume that the AMSTP region name is RegionExample and the revision number is 1.

Once the switches know the identities of the static STIs for which each is a root bridge, the switches can proceed to dynamically map traffic to each instance. For instance, switch 610 can observe that it is the network entry point for substantial traffic flows for two multicast group addresses, an address M1 and an address M2. Switch 610 proceeds to register and declare its three STIs and mappings to addresses M1 and M2, by sending the following GIRP messages on the CIST:

LeaveAll
JoinIn(MSTP Region Name RegionExample)
JoinIn(MSTP Revision Number 1)
JoinIn(MSTP Instance ID 0)
JoinIn(MSTP Instance ID 1) JoinIn(Multicast Group Address M1)
JoinIn(MSTP Instance ID 4) JoinIn(Multicast Group Address M2)

The first two JoinIn messages indicate that switch 610 is a GIRP entity for AMSTP Region RegionExample. Switch 610 also issues a JoinIn message for MSTP Instance ID 0, thereby preventing any other entity from registering traffic attributes to the default spanning tree instance (all unregistered traffic already passes through the default spanning tree instance). Switch 610 issues a JoinIn message pair for MSTP Instance ID 1 and Multicast Group Address M1. Each GIRP-enabled switch in the spanning tree that receives this message updates its filtering database to note the association between MSTP Instance ID 1 and Multicast Group Address M1. Similarly, Switch 610 issues a JoinIn message pair for MSTP Instance ID 2 and Multicast Group Address M2 to map that association across the spanning tree region.

Switch 620 can observe that it is the network entry point for substantial traffic flows for two multicast group addresses M3 and M4. Switch 620 proceeds to register and declare the two STIs for which is it the root bridge and mappings to addresses M3 and M4, by sending the following GIRP messages on the CIST:

---

LeaveAll
JoinIn(MSTP Region Name RegionExample)
JoinIn(MSTP Revision Number 1)
JoinIn(MSTP Instance ID 2)   JoinIn(Multicast Group Address M3)
                             JoinIn(Multicast Group Address M4)
JoinIn(MSTP Instance ID 5)

---

This message group operates in similar fashion to the message group issued by switch 610. Switch 620, however, chose to assign the two multicast group addresses M3 and M4 to the same MSTP Instance. Switch 620 has registered and declared MSTP Instance ID 5, although it is not presently mapping traffic to that instance. Depending on implementation, it may or may not be preferable to allow switches to register an instance to "reserve" it, even though it presently is not mapping any attribute to that instance. When preferable, each switch could be guaranteed a set minimum number of instances for its use, and it could reserve the minimum number in this fashion.

Assume that switch 630 has five VLANs with VLAN-IDs 6-10 that it desires to map to one of the spanning tree instances for which it is root. Switch 630 proceeds to register and declare instances and attributes as follows, by sending the following GIRP messages on the CIST:

```
LeaveAll
JoinIn(MSTP Region Name RegionExample)
JoinIn(MSTP Revision Number 1)
JoinIn(MSTP Instance ID 6)      JoinIn(VLAN-ID-range-Min 6)
                                 JoinIn(VLAN-ID-range-Max 10)
```

Switch 630 has now mapped traffic for VLAN-IDs 6 to 10 to instance 6. These VLAN-IDs could be identified from unmapped traffic flows in an embodiment. In the alternative, these VLAN-IDs can also be statically provisioned on switch 630—in a manner that ties the VLAN-IDs to the switch as a root bridge and not to a specific VLAN, as a standard MSTP mapping would do. For instance, a GIRP boot table can specify attributes that a switch should acquire to itself as a root bridge upon boot-up. After the static spanning tree instances are resolved, switch 630 selects one or more spanning tree instances for which it has become the root bridge, and uses GIRP to map the attributes in the GIRP boot table to those spanning tree instances. With this approach, a network administrator only has to provision a mapping on one switch, and does not have to explicitly map the attributes to a specific spanning tree instance.

Also, as part of this example, switch 630 has not registered spanning tree instance 3, for which it is the root bridge. As the spanning tree participants know that spanning tree instance 3 exists but is unused, another entity in the network (switch, endpoint, or management node) that has analyzed a traffic attribute and found that the attribute would be best handled through switch 630, that entity can issue a GIRP command to bind the attribute to STI 3. Although not shown in the example, each switch could maintain root bridge status for at least one STI that it does not register, allowing other network entities to direct traffic through that switch.

Another possibility in an embodiment is the dynamic addition of an instance to the spanning tree topology. For instance, suppose that switch 630 determines that it is receiving unmapped multicast group traffic for a multicast group address M5, and the traffic is following an unoptimized path on the CIST through switch 610. At this point, switch 630 has mapped five VLANs to STI 6, and another entity has registered STI 3. Thus switch 630 can choose to create a new spanning tree instance, rather than adding multicast group address M5 to STI 6 (although this is possible).

To create the new spanning tree and map traffic for multicast group address M5 to the new spanning tree, switch 630 selects an unused instance ID in the range 7-63, e.g., instance ID 9. Switch 630 issues the following GIRP messages:

JoinIn(MSTP Instance ID 9) JoinIn(Multicast Group Address M5)

The GIRP Participants do not immediately add a mapping between MSTP Instance ID 9 and Multicast Group Address M5 to their Filtering databases, since no spanning tree instance ID 9 exists. The spanning tree participants exchange new MSTP BPDUs that contain configuration messages for the new instance 9. Switch 630, as the switch that registered the instance ID, selects an advertised bridge priority for instance 9 of a lower numerical value than that selected by each other switch. The BPDUs propagate through the network and the spanning tree calculates the new spanning tree (with switch 630 as the root). Once the spanning tree has converged, each switch adds the mapping between STI 9 and multicast group address M5 to its filtering database.

Should another unmapped multicast group address M6 be identified by switch 630, it can choose to add the new address to STI 9 using the following GIRP messages:

JoinIn(MSTP Instance ID 9) JoinIn(Multicast Group Address M6)

This time, spanning tree instance 9 exists, and thus the GIRP Participants simply add the new mapping between MSTP Instance ID 9 and Multicast Group Address M6 to their Filtering databases.

At a later time, switch 630 may detect that it is no longer receiving traffic for the multicast group M5. After no traffic has been received for a significant time, switch 630 can decide to unmap the attribute from STI 9. Switch 630 issues the following GIRP messages:

JoinIn(MSTP Instance ID 9) LeaveIn(Multicast Group Address M5)

Each GIRP participant responds by removing the mapping between STI 9 and multicast group address M5 from its Filtering database. Should further traffic be received for multicast group address M5, that traffic will be switched using the CIST.

At a later time, should traffic for address M6 also drop below the applicable thresholds, switch 630 may choose to deregister that attribute, and may also choose to deregister spanning tree instance 9 and return that instance ID to the free pool. Switch 630 issues the following GIRP messages to cause all switches to remove address M6 from their filtering databases and remove STI 9 from their BPDUs:

LeaveIn(MSTP Instance ID 9) LeaveIn(Multicast Group Address M6)

The LeaveIn message for Multicast Group Address M6 could be omitted in this case, as the removal of MSTP Instance ID 9 would cause removal of all attributes linked to that instance.

Because switches are allowed to randomly select an unused STI when a new STI is needed, it is possible that two switches could select the same unused STI concurrently. This would result in a collision, as the other GIRP Participants would receive two JoinIn messages for the same unused MSTP Instance ID. Whenever a switch detects a collision for an MSTP Instance ID that is has just included in a GIRP JoinIn message (by receiving a JoinIn message from another switch for the same MSTP Instance ID), that switch issues a LeaveIn Message for that instance, waits a random amount of time (from 0 to X seconds), and then randomly selects an unused instance ID and attempts to register again. The value of X could have a default value such as 30 seconds, but could also be configurable by the network administrator.

Digests such as those used in MSTP and AMSTP can be defined across the dynamic attributes, with recalculation as attributes are dynamically added and removed from the spanning tree. This functions as a check that all switches are operating with the same dynamic attribute mapping. For instance, each GIRP Participant can save GIRP state in a predefined order, for which a digest is recalculated whenever the GIRP state changes. If for some reason a GIRP Participant loses a registration or removal, its digest may disagree with those sent by other switches. In such a case it can issue a GIRP JoinEmpty message for the MSTP Region Name, causing all switches to resend JoinIn messages for all of their instances and attributes.

Figure 7:
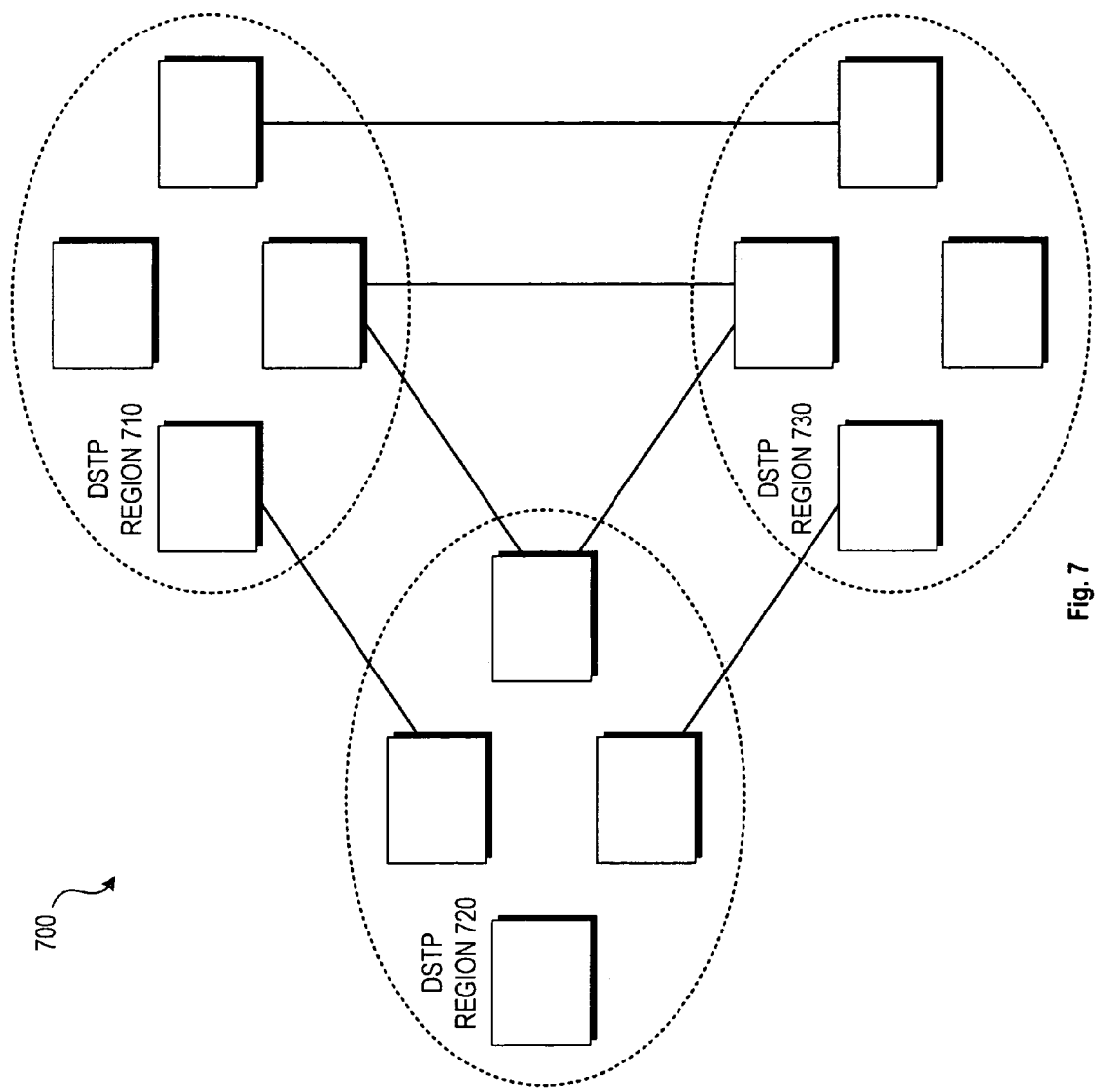
FIG. 7 shows three connected dynamic STP regions, each region operating its own dynamic multi-instance spanning tree solution.

GIRP PDUs are not exchanged across dynamic STP (DSTP) Regions. FIG. 7 shows a network configuration 700 with three separate DSTP Regions 710, 720, and 730. Each switch in each DSTP region will not forward GIRP PDUs on its links that are known to be region boundary links. The switches can detect region boundary links because the BPDUs received on the boundary ports will contain a different static digest value. Thus each region can block/forward traffic internally based on different static and dynamic traffic attributes, without affecting the attributes used by other regions. Between the regions, a standard single-instance Spanning Tree Protocol determines which ports will be blocking and forwarding.

Those skilled in the art will appreciate that the embodiments and/or various features of the embodiments can be combined in other ways than those described to implement dynamic spanning tree concepts covered by the present disclosure. Although specific enabling approaches have been described, others exist. For instance, instead of a GARP-based vehicle for conveying dynamic instance and attribute mapping, the MSTP BPDUs could be modified to carry additional information necessary to implement dynamic spanning tree configuration.

A variety of hardware, software, and combination approaches are possible for implementation of an embodiment and various features thereof. No limitation to a specific approach is suggested or intended by this disclosure.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of modifying a spanning tree configuration for a group of packet switches in a common spanning tree domain, the method comprising:

automatically detecting a resource change selected from the group of resource changes consisting of: a change in the status of redundant backup hardware in the group packet switch; a change in at least one environmental parameter detected at the group packet switch; a chance in the rate of correctable errors detected at one or more points in the group packet switch; a change in hardware status affecting the packet throughput of the group packet switch; a change in status affecting the uplink capability of the group packet switch; a change in the capability of the group packet switch to process traffic with selected traffic attributes; and combinations thereof, that indicates the current spanning tree configuration is less than optimal for at least some traffic present in the spanning tree domain;

in response to the resource change detection, automatically modifying at least one spanning tree parameter for at least one of the packet switches; and converging the common spanning tree domain to a new spanning tree solution in consideration of the at least one modified spanning tree parameter.

2. The method of claim 1, further comprising analyzing the root bridge priority for at least one spanning tree instance in the common spanning tree domain.

3. The method of claim 2, wherein modifying at least one spanning tree parameter comprises changing the bridge priority of the group packet switch acting as the root bridge for the at least one spanning tree instance to make that packet switch less attractive as a root bridge for the at least one spanning tree instance.

4. The method of claim 2, wherein modifying at least one spanning tree parameter comprises changing the bridge priority of a second group packet switch other than the group packet switch acting as the root bridge for the at least one spanning instance to make the second group packet switch more attractive as a root bridge for the at least one spanning tree instance.

5. The method of claim 4, wherein modifying at least one spanning tree parameter further comprises changing the bridge priority of the group packet switch acting as the root bridge for the at least one spanning tree instance to make that packet switch less attractive as a root bridge for the at least one spanning tree instance.

6. The method of claim 2, wherein the common spanning tree domain comprises multiple spanning tree instances.

7. The method of claim 1, wherein the at least one spanning tree parameter comprises a bridge priority.

8. The method of claim 1, wherein the at least one spanning tree parameter comprises a port priority or a root path cost.

9. The method of claim 1, further comprising accounting for the location of group packet switches in the common spanning tree domain topology to select the at least one of the packet switches for modifying at least one spanning tree parameter.

10. The method of claim 9, wherein accounting for the location of group packet switches comprises designating a subset of the group of packet switches as switches that can become root bridges, and limiting automatic modification of spanning tree parameters such that only designated switches will be elected as a root bridge as long as one oldie designated switches is connected and participating in the spanning tree domain.

11. The method of claim 1, further comprising assigning values to resources in the group packet switch, wherein automatically modifying at least one spanning tree parameter comprises calculating a bridge priority using the assigned resource values and the status of the resources associated with those resource values.

12. The method of claim 11, wherein calculating a bridge priority produces a preliminary bridge priority with finer granularity than that allowed for reported bridge priorities, further comprising modifying the preliminary bridge priority to one of a group of allowable bridge priorities.

13. The method of claim 1, wherein automatically detecting an event comprises detecting the location of a traffic entry point into the common spanning tree domain.

14. The method of claim 13, wherein detecting the location of a traffic entry point comprises detecting the identity of a group packet switch acting as a protocol independent multicast forwarder.

15. The method of claim 14, wherein automatically modifying at least one spanning tree parameter comprises modifying at least one bridge priority to cause election of the group packet switch acting as the protocol independent multicast forwarder as the root bridge for at least one spanning tree instance associated with traffic handled by the protocol independent multicast forwarder.

16. The method of claim 13, wherein detecting the location of a traffic entry point comprises snooping control packets entering a group packet switch at an edge port.

17. The method of claim 16, wherein the control packets are protocol independent multicast packets, the method further comprising detecting the identity of the group packet switch acting as a protocol independent multicast forwarder from snooping the protocol independent multicast packets.

18. The method of claim 16, wherein the control packets are virtual router redundancy protocol packets, the method further comprising detecting the identity of the group packet switch acting as a virtual router redundancy protocol master from snooping the virtual router redundancy protocol packets.

19. The method of claim 16, further comprising selecting control packets for snooping according to an access control list that specifies protocols that are either denied or permitted to cause spanning tree topology changes.

20. The method of claim 14, wherein detecting the location of a traffic entry point comprises detecting a switch in the group of packet switches that is acting as a virtual router redundancy protocol master.

21. The method of claim 13, wherein detecting the location of a traffic entry point comprises monitoring the states of a control protocol, and reconfiguring the set of spanning trees in response to a change in state of the control protocol.

22. The method of claim 21, further comprising selecting protocols for monitoring according to an access control list that specifies protocols that are either denied or permitted to cause spanning tree topology changes.

23. The method of claim 21, wherein monitoring is conducted remotely by a device that is not a group packet switch.

24. The method of claim 1, further comprising logging the automatically detected events, indicating that the current spanning tree configuration is less than optimal for at least some traffic present in the spanning tree domain, and that cause modification of at least one spanning tree parameter, in an event log.

25. The method of claim 24, further comprising analyzing the event log to detect repeated occurrences of an event and modify the response to the event detection based on the event frequency.

26. The method of claim 25, wherein modifying the response to the event detection comprises denying modification of spanning tree parameters based on the event.

27. The method of claim 25, wherein modifying the response to the event detection comprises adjusting a threshold that effects the ability of the event to cause modification of spanning tree parameters.

28. The method of claim 27, further comprising limiting the frequency of converging the common spanning tree domain to a new spanning tree solution to less than once for each modification of a spanning tree parameter.

* * * * *